Patented Dec. 15, 1936

2,064,564

UNITED STATES PATENT OFFICE

2,064,564

PREPARATION OF MONOMETHYLOL KETONES

William M. Quattlebaum, Jr., Charleston, W. Va., assignor, by mesne assignments, to Union Carbide and Carbon Corporation, a corporation of New York No Drawing. Application July 3, 1935, Serial No. 29,675

16 Claims. (Cl. 260—134)

The invention relates to the preparation of monomethylol ketones, such as monomethylol acetone, monomethylol methyl ethyl ketone, and similar monomethylol derivatives of the higher aliphatic saturated ketones.

Acetone and its homologues have heretofore been reacted with formaldehyde in an aqueous alkaline solution to produce both dimethylol and monomethylol derivatives of the ketone reactant. Various reaction conditions suitable to promote the formation of one or the other of these products have been suggested, but poor yields, and large quantities of material which cannot be distilled without decomposition, have invariably been obtained in these processes. The prior art is in fact uncertain, and in conflict, as to the most suitable manner of controlling such a reaction to produce only the monomethylol ketone, and shows both this compound and the dimethylol derivative as a single product from substantially similar reaction conditions.

In accordance with my invention, I have found a reliable and readily controlled manner of conducting the condensation of formaldehyde with ketones to produce efficient yields of monomethylol ketones, and a product containing less decomposable oils and insoluble resinous materials than is obtained in prior reactions. In the process paraformaldehyde is used as the source of aldehyde reactant. This material is depolymerized in a faintly alkaline solution of the desired ketone, and subsequent condensation is then effected at a low temperature, preferably not above about 5° C. The reaction is thus conducted under anhydrous conditions, which obviates the difficulty of removing water from the ketol product, and permits more ready control of the reaction to the production of yields much higher than those heretofore obtainable.

Depolymerizing of the paraformaldehyde is accomplished by warming to a temperature of about 45° C. to 50° C. a suspension of the compound in the liquid ketone, which has been made very slightly alkaline with an alcoholic caustic solution. In the proportions of about one mol. of paraformaldehyde to ten mols of the ketone, the aldehyde goes completely into solution in about five to ten minutes, and since heating is necessary to maintain the temperature, solution obviously depends upon depolymerization rather than upon the strongly exothermic aldol reaction. This solution is then cooled and allowed to stand at a temperature of 0° C. to 5° C., until formaldehyde can no longer be detected by the aniline acetate test. The completed reaction solution is then neutralized, preferably with tartaric or another organic acid, filtered, and distilled under reduced pressure to isolate the pure ketol product.

The following examples are illustrative of specific applications of the process:

Example 1

A suspension of one mol. of paraformaldehyde in ten mols of methyl ethyl ketone was made faintly alkaline to phenolphthalein with an alcoholic caustic soda solution, and warmed to a temperature of 45° C. to 50° C. After stirring for five to ten minutes the paraformaldehyde was completely depolymerized and dissolved. The solution was then cooled and allowed to stand in a brine bath at a temperature of 0° C. to 5° C. until a sample failed to give the aniline acetate test for formaldehyde. It was then neutralized with tartaric acid and filtered. Excess methyl ethyl ketone was removed by distillation, and pure monomethylol methyl ethyl ketone ($CH_3$—$CO$—$CH(CH_2OH)$—$CH_3$) was obtained by vacuum fractionation of the residue.

Example 2

In a manner substantially similar to the above, paraformaldehyde and acetone were reacted. Similar molecular proportions of the aldehyde and ketone were used. The paraformaldehyde was dissolved in the acetone, made slightly alkaline with alcoholic caustic, and the condensation effected at a temperature varying from 0° C. to 5° C. A very good yield of monomethylol acetone ($CH_3$—$CO$—$CH_2$—$CH_2$—$OH$) was obtained.

Example 3

In a test of the process as applied to a higher ketone reactant, 2 methyl 7 ethyl undecanone-4 was condensed with paraformaldehyde, in proportions of one mol. of the aldehyde to four mols of the ketone. Here also the procedure and reaction conditions were similar to those in the above two examples. The ketol product had a boiling point of 135° C. to 138° C. at 2 to 3 mm. pressure, and may be termed monomethylol 2 methyl 7 ethyl undecanone-4.

Modification in the preferred reaction conditions, as represented by the above examples, can be made, and may be desirable with different ketone reactants. The invention should not be limited other than as defined in the appended claims.

I claim:

1. The process for preparing monomethylol ketones which comprises depolymerizing paraformaldehyde in the presence of a slightly alkaline anhydrous ketone solution, and subsequently condensing the resulting anhydrous formaldehyde with said ketone at low temperature.

2. The process for preparing monomethylol ketones which comprises depolymerizing paraformaldehyde in the presence of a slightly alkaline anhydrous solution of an aliphatic saturated ketone, and subsequently effecting a condensation reaction at a temperature not higher than 5° C.

3. The process for preparing monomethylol ketones which comprises depolymerizing paraformaldehyde in the presence of a slightly alkaline anhydrous solution of an aliphatic saturated ketone, and subsequently effecting a condensation reaction at a temperature of about 0° C. to about 5° C.

4. The process for preparing monomethylol ketones which comprises dissolving paraformaldehyde in a slightly alkaline anhydrous solution of an aliphatic saturated ketone by heating a mixture thereof, and subsequently effecting a condensation reaction at a temperature of about 0° C. to about 5° C.

5. The process for preparing monomethylol ketones which comprises dissolving paraformaldehyde in a slightly alkaline anhydrous solution of an aliphatic saturated ketone by heating a mixture thereof to a temperature of about 45° C. to 50° C., and subsequently effecting a condensation reaction at a temperature of about 0° C. to about 5° C.

6. The process for preparing monomethylol ketones which comprises mixing paraformaldehyde and a saturated aliphatic ketone made slightly alkaline with minor proportions of an alcoholic caustic alkali solution, heating the mixture until the paraformaldehyde is completely dissolved, cooling and maintaining the solution at a temperature of about 0° C. to about 5° C. for a time sufficient to effect condensation, and recovering the monomethylol ketone from the reaction product.

7. The process for preparing monomethylol ketones which comprises mixing paraformaldehyde and a saturated aliphatic ketone made slightly alkaline with minor proportions of an alcoholic caustic alkali solution, heating the mixture at a temperature of about 45° C. to 50° C. until the paraformaldehyde is completely dissolved, cooling and maintaining the solution at a temperature of about 0° C. to about 5° C. for a time sufficient to effect condensation, neutralizing the reaction product with tartaric acid, and recovering the monomethylol ketone therefrom by fractionation.

8. The process for preparing monomethylol methyl ethyl ketone which comprises dissolving paraformaldehyde in a slightly alkaline anhydrous solution of methyl ethyl ketone by heating a mixture thereof, and subsequently effecting a condensation reaction at a temperature of about 0° C. to about 5° C.

9. The process for preparing monomethylol methyl ethyl ketone which comprises dissolving paraformaldehyde in a slightly alkaline anhydrous solution of methyl ethyl ketone by heating a mixture thereof to a temperature of about 45° C. to 50° C., and subsequently effecting a condensation reaction at a temperature of about 0° C. to about 5° C.

10. The process for preparing monomethylol methyl ethyl ketone, which comprises mixing one mol. of paraformaldehyde with ten mols of methyl ethyl ketone made slightly alkaline with an alcoholic caustic alkali solution, heating the mixture at a temperature of about 45° C. to 50° C. until the paraformaldehyde is completely dissolved, cooling and maintaining the solution at a temperature of about 0° C. to about 5° C. for a time sufficient to effect condensation, neutralizing the reaction product with tartaric acid, and removing therefrom the monomethylol methyl ethyl ketone by fractionation.

11. The process for preparing monomethylol acetone which comprises dissolving paraformaldehyde in a slightly alkaline anhydrous solution of acetone by heating a mixture thereof, and subsequently effecting a condensation reaction at a temperature of about 0° C. to about 5° C.

12. The process for preparing monomethylol acetone which comprises dissolving paraformaldehyde in a slightly alkaline anhydrous solution of acetone by heating a mixture thereof to a temperature of about 45° C. to 50° C. and subsequently effecting a condensation reaction at a temperature of about 0° C. to about 5° C.

13. The process for preparing monomethylol acetone, which comprises mixing one mol. of paraformaldehyde with ten mols of acetone made slightly alkaline with an alcoholic caustic alkali solution, heating the mixture at a temperature of about 45° C. to 50° C. until the paraformaldehyde is completely dissolved, cooling and maintaining the solution at a temperature of about 0° C. to about 5° C. for a time sufficient to effect condensation, neutralizing the reaction product with tartaric acid, and removing therefrom the monomethylol acetone by fractionation.

14. The process for preparing monomethylol 2 methyl 7 ethyl undecanone-4, which comprises dissolving paraformaldehyde in a slightly alkaline anhydrous solution of 2 methyl 7 ethyl undecanone-4 by heating a mixture thereof, and subsequently effecting a condensation reaction at a temperature of about 0° C. to about 5° C.

15. The process for preparing monomethylol 2 methyl 7 ethyl undecanone-4 which comprises dissolving paraformaldehyde in a slightly alkaline anhydrous solution of 2 methyl 7 ethyl undecanone-4 by heating a mixture thereof to a temperature of about 45° C. to 50° C., and subsequently effecting a condensation reaction at a temperature of about 0° C. to about 5° C.

16. The process for preparing monomethylol 2 methyl 7 ethyl undecanone-4, which comprises mixing one mol. of paraformaldehyde with four mols of 2 methyl 7 ethyl undecanone-4 made slightly alkaline with an alcoholic caustic alkali solution, heating the mixture at a temperature of about 45° C. to 50° C. until the paraformaldehyde is completely dissolved, cooling and maintaining the solution at a temperature of about 0° C. to about 5° C. for a time sufficient to effect condensation, neutralizing the reaction product with tartaric acid, and removing therefrom the monomethylol 2 methyl 7 ethyl undecanone-4 by fractionation.

WILLIAM M. QUATTLEBAUM, JR.